United States Patent
Jung et al.

(10) Patent No.: US 9,870,568 B2
(45) Date of Patent: Jan. 16, 2018

(54) METHODS AND SYSTEMS TO PRICE CUSTOMIZED VIRTUAL MACHINES

(71) Applicant: Xerox Corporation, Norwalk, CT (US)

(72) Inventors: Gueyoung Jung, Rochester, NY (US); Tridib Mukherjee, Bangalore (IN); Shruti Kunde, Mumbai (IN)

(73) Assignee: Xerox Corporation, Norwalk, CT (US)

( * ) Notice: Subject to any disclaimer, the term of this patent is extended or adjusted under 35 U.S.C. 154(b) by 506 days.

(21) Appl. No.: 14/083,789

(22) Filed: Nov. 19, 2013

(65) Prior Publication Data

US 2015/0142524 A1  May 21, 2015

(51) Int. Cl.
  *G06Q 30/02*  (2012.01)
(52) U.S. Cl.
  CPC ............... *G06Q 30/0206* (2013.01)
(58) Field of Classification Search
  CPC .... G06Q 20/14; G06Q 30/04; G06Q 30/0206; H04L 47/2433; H04M 15/58
  USPC .................. 705/40, 7.35; 707/725
  See application file for complete search history.

(56) References Cited

U.S. PATENT DOCUMENTS

| | | | | |
|---|---|---|---|---|
| 8,306,911 B1 * | 11/2012 | Heath | ................. | G06Q 10/0637 705/40 |
| 8,392,575 B1 * | 3/2013 | Marr | ..................... | G06F 9/5061 370/252 |
| 8,429,165 B1 | 4/2013 | Jung et al. | | |
| 8,516,191 B2 * | 8/2013 | Matsuki | ................ | G06F 3/0607 709/224 |
| 8,650,299 B1 * | 2/2014 | Huang | .................. | G06F 9/5077 709/226 |
| 9,215,142 B1 * | 12/2015 | Herold | ................. | H04L 41/084 |
| 2006/0259621 A1 * | 11/2006 | Ranganathan | .......... | G06F 1/206 709/226 |
| 2007/0106992 A1 * | 5/2007 | Kitamura | .............. | G06F 3/0607 718/104 |
| 2007/0250838 A1 * | 10/2007 | Belady | ................ | G06F 11/3409 718/105 |

(Continued)

OTHER PUBLICATIONS

U.S. Appl. No. 13/606,023, filed Sep. 7, 2012, and assigned to the same assignee (Xerox Corporation).

(Continued)

*Primary Examiner* — Matthew Gart
*Assistant Examiner* — Stephen S Swartz
(74) *Attorney, Agent, or Firm* — Jones Robb, PLLC (57) ABSTRACT

Methods and systems for determining prices of customized virtual machines required to process customer-specified workloads are disclosed. A count of instances of the customized virtual machines, required to process the customer-specified workloads is determined, based on a configuration of the customized virtual machines. The instances of the customized virtual machines are consolidated on virtual machine servers. Further, the prices of the customized virtual machines are determined based on a count of the virtual machine servers, unused resources in the virtual machine servers, and unused resources in the customized virtual machines. The determined prices are recommended to the customer. Further, at least one of the prices of the customized virtual machines or the configuration of at least one or more customized virtual machines is modified, based on a response to the recommendation received from the customer.

7 Claims, 3 Drawing Sheets

(56) References Cited

U.S. PATENT DOCUMENTS

| | | | |
|---|---|---|---|
| 2008/0098194 A1* | 4/2008 | Hashimoto | G06F 1/3221 711/173 |
| 2008/0295096 A1* | 11/2008 | Beaty | G06F 9/4856 718/1 |
| 2009/0055834 A1* | 2/2009 | Ding | G06F 9/5077 718/104 |
| 2009/0070771 A1* | 3/2009 | Yuyitung | G06Q 10/06 718/105 |
| 2009/0158275 A1* | 6/2009 | Wang | G06F 9/5077 718/1 |
| 2010/0082319 A1* | 4/2010 | Cherkasova | G06F 9/5083 703/22 |
| 2010/0205395 A1* | 8/2010 | Srinivasan | G06F 9/45558 711/170 |
| 2011/0055034 A1* | 3/2011 | Ferris | G06Q 30/0283 705/26.1 |
| 2011/0202925 A1* | 8/2011 | Banerjee | G06F 9/5011 718/104 |
| 2011/0252420 A1* | 10/2011 | Tung | G06F 9/45533 718/1 |
| 2012/0011509 A1* | 1/2012 | Husain | G06F 9/5088 718/1 |
| 2012/0109705 A1* | 5/2012 | Belady | G06Q 10/06312 705/7.22 |
| 2012/0124581 A1* | 5/2012 | Nitta | G06F 8/65 718/1 |
| 2012/0131578 A1* | 5/2012 | Ciano | G06F 9/45558 718/1 |
| 2012/0221696 A1* | 8/2012 | Ferris | H04L 67/327 709/223 |
| 2012/0246638 A1* | 9/2012 | He | G06F 9/45558 718/1 |
| 2013/0055262 A1* | 2/2013 | Lubsey | G06F 9/5072 718/1 |
| 2014/0058871 A1* | 2/2014 | Marr | G06F 9/45533 705/26.1 |
| 2014/0165063 A1* | 6/2014 | Shiva | G06F 9/45533 718/1 |

OTHER PUBLICATIONS

G. Jung, K. Joshi, M. Hiltunen, R. Schlichting, and C. Pu, A Cost-Sensitive Adaptation Engine for Server Consolidation of Multitier Applications, USENIX Middleware, 2009.

M. Cardosa, A. Singh, H. Pucha, and A. Chandra, Exploiting Spatio-Temporal Tradeoffs for Energy-Aware MapReduce in the Cloud, IEEE International Conference on Cloud Computing, 2011.

G. Jung, K. Joshi, M. Hiltunen, R. Schlichting, and C. Pu, Generating Adaptation Policies for Multitier Applications in Consolidated Server Environments, IEEE International Conference on Autonomic Computing, 2008.

\* cited by examiner

METHODS AND SYSTEMS TO PRICE CUSTOMIZED VIRTUAL MACHINES

TECHNICAL FIELD

The presently disclosed embodiments are related, in general, to a cloud-computing network. More particularly, the presently disclosed embodiments are related to methods and systems for determining configuration and price of a customized virtual machine in the cloud-computing network.

BACKGROUND

Advancements in the field of virtualization and shared computing have led to the development of cloud computing. A typical cloud-computing network may include a data centre, in which a large number of computers are connected over a communication network. Such data centers include one or more virtual machine servers that host one or more virtual machines (VMs). These virtual machines may be allocated to cloud customers (hereinafter referred to as the customers) as one or more computational resources for executing various kinds of applications/workloads. Typically, the one or more computational resources may include, but are not limited to, CPU, random access memory (RAM), storage space, software, and so forth.

In a general scenario, the virtual machines offered to the customers are of fixed configuration i.e., for a workload, there exists a virtual machine having a pre-defined configuration for executing the workload. These virtual machines are built upon a physical server (i.e., virtual machine server) such that each virtual machine has a fixed capacity as fixed amount of computational resources of the virtual machine server. As the virtual machines are of fixed configuration, a large amount of unused resources may be left over while consolidating these virtual machines on the virtual machine servers. For example, the configuration of a small virtual machine server is 2 CPUs, 3 GB RAM, and 80 GB disk space and the configuration of the virtual machine having fixed configuration is of 1 CPU, 1 GB RAM, and 30 GB disk space. If two instances of the virtual machine are required to execute a workload and these two instances of the virtual machine are consolidated on the virtual machine server, the two instances of the virtual machine will completely utilize the processing power of the virtual machine server; however, 1 GB RAM and 20 GB disk space will be left over after consolidating the two instances of the virtual machines. Hence, there is a need to utilize the computational resources in the virtual machine server in an efficient manner by precisely customizing the virtual machine capacity (i.e., configuration) for the workload.

Further, with increasing number of cloud service providers, the customers have a number of options to select VMs for execution of the workload. In an embodiment, one of the major factors that play an important role in selecting the cloud service provider is the price of the respective VM being offered to the customers. Hence, there is a need to develop a system or method to determine a competitive price of the virtual machine to the customers.

SUMMARY

According to embodiments illustrated herein there is a method for determining prices of one or more customized virtual machines required to process one or more customer-specified workloads. The method includes determining a count of instances of each of the one or more customized virtual machines required to process each of the one or more customer-specified workloads, based on a configuration of each of the one or more customized virtual machines; consolidating the instances of the one or more customized virtual machines on one or more virtual machine servers, based on the count of the instances of the one or more customized virtual machines; and determining the prices of the one or more customized virtual machines based on a count of the one or more virtual machine servers required for the consolidation, unused resources in the one or more virtual machine servers, and unused resources in the one or more customized virtual machines. The prices are recommended to a customer. The method further includes modifying at least one of the prices of the one or more customized virtual machines or the configuration of the one or more customized virtual machines based on a response to the recommendation received from the customer. The method is performed by one or more processors.

According to embodiments illustrated herein there is a system for determining prices of one or more customized virtual machines required to process one or more customer-specified workloads. The system include one or more processors operable to: determine a count of instances of each of the one or more customized virtual machines required to process each of the one or more customer-specified workloads, based on a configuration of each of the one or more customized virtual machines; consolidate the instances of the one or more customized virtual machines on one or more virtual machine servers, based on the count of the instances of the one or more customized virtual machines; and determine the prices of the one or more customized virtual machines based on a count of the one or more virtual machine servers required for the consolidation, unused resources in the one or more virtual machine servers, and unused resources in the one or more customized virtual machines. The prices are recommended to a customer. The one or more processors are further operable to modify at least one of the prices of the one or more customized virtual machines or the configuration of the one or more customized virtual machines based on a response to the recommendation received from the customer.

According to embodiments illustrated herein, there is a computer program product for use with a computer. The computer program product includes a non-transitory computer readable medium. The non-transitory computer readable medium stores a computer program code for determining prices of one or more customized virtual machines required to process one or more customer-specified workloads. The computer program code is executable by one or more processors to: determine a count of instances of each of the one or more customized virtual machines required to process each of the one or more customer-specified workloads, based on a configuration of each of the one or more customized virtual machines; consolidate the instances of the one or more customized virtual machines on one or more virtual machine servers, based on the count of the instances of the one or more customized virtual machines; and determine the prices of the one or more customized virtual machines based on a count of the one or more virtual machine servers required for the consolidation, unused resources in the one or more virtual machine servers, and unused resources in the one or more customized virtual machines. The prices are recommended to a customer. The computer program code is further executable by the one or more processors to modify at least one of the prices of the one or more customized virtual machines or the configuration of the one or more customized virtual machines based on a response to the recommendation received from the customer.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

"Computational resources" refer to resources required for executing an application/workload. In an embodiment, the computational resources correspond to, but are not limited to, processor instances, storage space, RAM space, software applications, security services, and database services, using which the application/workload can be executed.

A "cloud network" corresponds to a universal collection of the computational resources over the internet and forms individual units within the virtualization environment. In an embodiment, one or more computing devices, registered with the cloud network, utilize the computational resources to perform respective operations. In an embodiment, the cloud network may provide one or more services such as, but not limited to, Infrastructure as a service (IaaS), Platform as a service (Paas), Software as a service (SaaS), Storage as a service (STaaS), Security as a service (SECaaS), and Data as a service (DaaS). Some examples of the cloud network may include, but are not limited to, Amazon EC2, Eucalyptus, Windows Azure, etc.

A "workload" refers to an application or software that the customers want to execute on the cloud network. The customers use the computational resources to execute the one or more workloads on the cloud network. The workloads may vary in their resource requirements; for example, some workloads may be memory-intensive (and thus may require large memory space to be executed), while other workloads may be CPU-intensive.

A "cloud service provider" refers to an organization that maintains the "cloud network". The cloud service provider may host various types of computational resources (e.g., processor instances, storage space, RAM space, and the like.) on the cloud network. Some examples of the cloud service provider may include, but are not limited to, Amazon, Microsoft, IBM, etc.

A "virtual machine (VM)" refers to a software that emulates a physical computing environment on a computing device upon which an operating system (OS) or program can be installed and run. The virtual machines are installed upon a virtualization layer such as a virtualization platform or a hypervisor that manages the virtual machine and handles communication between the virtual machine and the underlying physical hardware of the computing device. In an embodiment, multiple virtual machines may be implemented on the virtualization layer. The cloud service providers may recommend the computational resources to the customers in the form of the virtual machines (VMs). For example, a collection of, 1 GB RAM, 2 CPUs, and a disk space of 20 GB may constitute one virtual machine.

A "virtual machine server" refers to a computational device that can host one or more virtual machines. The virtual machine server may include a middleware (known as hypervisor) that controls the allocation of the computational resources associated with the VMs.

A "customized virtual machine" refers to a virtual machine that may be customized as per the computational resource requirement of the workloads to be executed on it.

A "consolidation" refers to a process of accommodating/ building one or more virtual machines on one or more virtual machine servers. For example, in a scenario where the cloud network includes two virtual machine servers and the cloud network determines that a customer requires three instances of virtual machines to process the workload, the cloud network may build these three virtual machines instances on the two available virtual machine servers. Such process of building virtual machine instances on the available virtual machine servers is referred to as consolidation. The consolidation may be performed by one or more known techniques such as first-fit bin-packing and best-fit bin-packing.

A "price" refers to a remuneration received by the cloud service provider for sharing the one or more computational resources (i.e., the VMs). In an embodiment, the price of the virtual machine depends on the computational resources associated with the virtual machines. In an embodiment, price may correspond to strengthening of the relationship between cloud service provider and the customer. For example, the customer may send more workloads for execution to the cloud service provider.

A "ratio of resource capacity" corresponds to a ratio of capacity of the various computational resources in a computing device among each other. For example, a computing device has a 8CPU, 16 GB RAM and 512 GB Memory, then the ratio of resource capacity will include a ratio of CPU is to RAM (i.e., 1:2)

Figure 1:
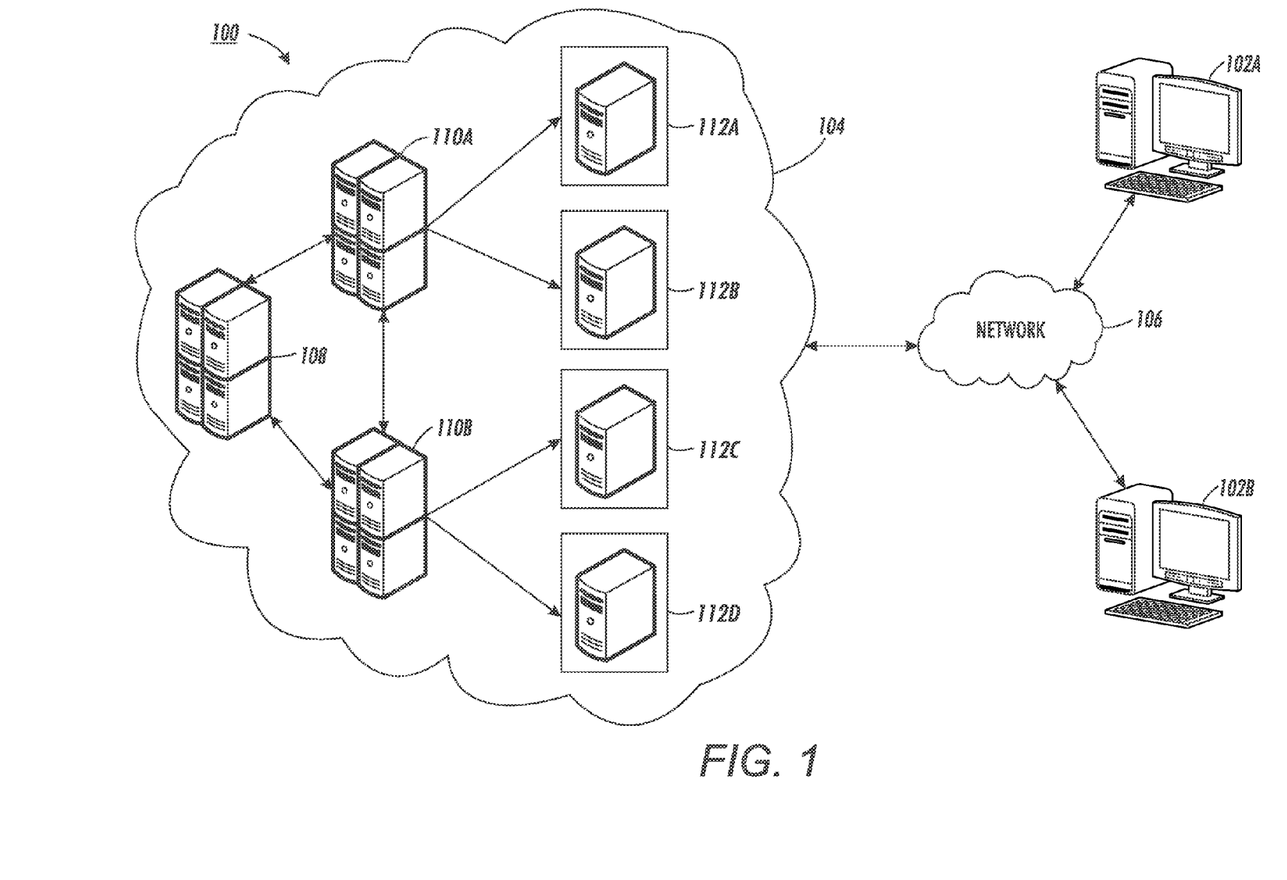
FIG. 1 is a block diagram illustrating a system environment in which various embodiments can be implemented.

FIG. 1 is a block diagram illustrating a system environment 100 in which various embodiments can be implemented. The system environment 100 includes one or more customer-computing devices 102A and 102B (hereinafter, collectively referred to as customer-computing devices 102), a cloud network 104, and a network 106. The cloud network 104 includes a cloud control server 108, one or more virtual machine servers 110A and 110B (hereinafter, collectively, referred to as virtual machine servers 110) and one or more customized virtual machines 112A-D (hereinafter, collectively referred to as the customized virtual machines 112). In an embodiment, the various devices of the system environment 100 (i.e., the customer-computing devices 102, the cloud control server 108, and the virtual machine servers 110) may be interconnected over the network 106.

The customer-computing devices 102 refer to computing devices used by the customers, who want to rent/purchase the customized virtual machines 112 from the cloud service provider. In an embodiment, a customer may access the customized virtual machines 112 using a web interface or a client application on the customer-computing device 102A. Further, the customer-computing devices 102 may transmit a workload, through the web interface or the client application, to the customized virtual machines 112 for processing. The customer-computing devices 102 may include a variety of computing devices, such as a desktop, a laptop, a personal digital assistant (PDA), a tablet computer, and the like.

The network 106 corresponds to a medium through which content and messages/signals flow between various devices of the system environment 100 (i.e., the customer-computing devices 102, the cloud control server 108, and the virtual machine servers 110). Examples of the network 106 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 106 in accordance with various wired and wireless communication protocols such as Transmission Control Protocol and Internet Protocol (TCP/IP), User Datagram Protocol (UDP), and 2G, 3G, or 4G communication protocols.

The cloud control server 108 refers to a computing device that controls the cloud network 104. In an embodiment, the cloud control server 108 may determine a configuration of the customized virtual machines 112 as per the computational resources required to process the workload (received from the customer). In addition, the cloud control server 108 determines a number of instances of the customized virtual machines 112 required to process the workload. Post determining the instances and the configuration of the customized virtual machines 112, the cloud control server 108 interacts with the hypervisors of the virtual machine servers 110 to consolidate the customized virtual machines 112 on the virtual machine servers 110. The cloud control server 108 may consolidate the customized virtual machines 112 on the virtual machine servers 110 using known methods such as bin-packing. Further, the cloud control server 108 determines the prices of the customized virtual machines 112. Details about the determination of the configuration and the price have been discussed in conjunction with FIG. 3. The cloud control server 108 may be realized through various types of servers such as, but not limited to, Java server, .NET framework, and Base4 server.

The virtual machine servers 110 refer to computing devices that can host the customized virtual machines 112. In an embodiment, the customized virtual machines 112, as determined by the cloud control server 108, may be consolidated on the virtual machine servers 110. Further, in an embodiment, the virtual machine servers 110 include hypervisor that interact with the cloud control server 108 for the consolidation of the customized virtual machines 112. The hypervisor may manage the customized virtual machines 112 by mapping the computational resources associated with the customized virtual machines 112 to the hardware resources of the virtual machine servers 110. Examples of the hypervisor may include, but are not limited to, VMware®, KVM®, Xen®, etc.

The customized virtual machines 112 refer to a set of virtual machines that are hosted on the virtual machine servers 110. In an embodiment, the customized virtual machines 112 are offered to the customers for processing the workload. In an embodiment, the configuration of the customized virtual machines 112 is determined based on the computational resource requirement of the workload.

It will be apparent to a person having ordinary skill in the art that the functionalities of the cloud control server 108 may be integrated with the virtual machine servers 110, without departing from the scope of the disclosure.

Figure 2:
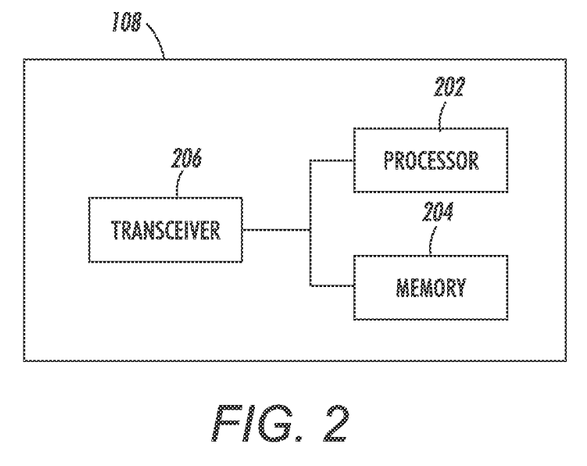
FIG. 2 is a block diagram illustrating a cloud control server for determining a price of a customized virtual machine and a configuration of the customized virtual machine, in accordance with at least one embodiment.

FIG. 2 is a block diagram illustrating the cloud control server 108 for determining the prices of the customized virtual machines 112 and the configuration of the customized virtual machines 112 in accordance with at least one embodiment. The cloud control server 108 includes a processor 202, a transceiver 206, and a memory 204. The processor 202 is coupled to the transceiver 206 and the memory 204. The transceiver 206 is connected to the network 106.

The processor 202 includes suitable logic, circuitry, and/or interfaces operable to execute one or more instructions stored in the memory 204 to perform predetermined operation on the cloud control server 108. The memory 204 may be operable to store the one or more instructions. The processor 202 may be implemented using one or more processor technologies known in the art. Examples of the processor 202 may include, but not limited to, an X86 processor, a RISC processor, an ASIC processor, a CISC processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person having ordinary skills in the art that the one or more instructions stored in the memory 204 enable the hardware of the cloud control server 108 to perform the predetermined operation.

The transceiver 206 transmits and receives messages and data to/from various components of the system environment 100 (i.e., the customer-computing devices 102, the virtual machine servers 110, etc.). Examples of the transceiver 206 may include, but are not limited to, an antenna, an Ethernet port, a USB port or any other port that can be configured to receive and transmit data. The transceiver 206 transmits and receives data/messages in accordance with the various communication protocols, such as, TCP/IP, UDP, and 2G, 3G, or 4G communication protocols. Operation of the cloud control server 108 has been described in conjunction with FIG. 3.

Figure 3:
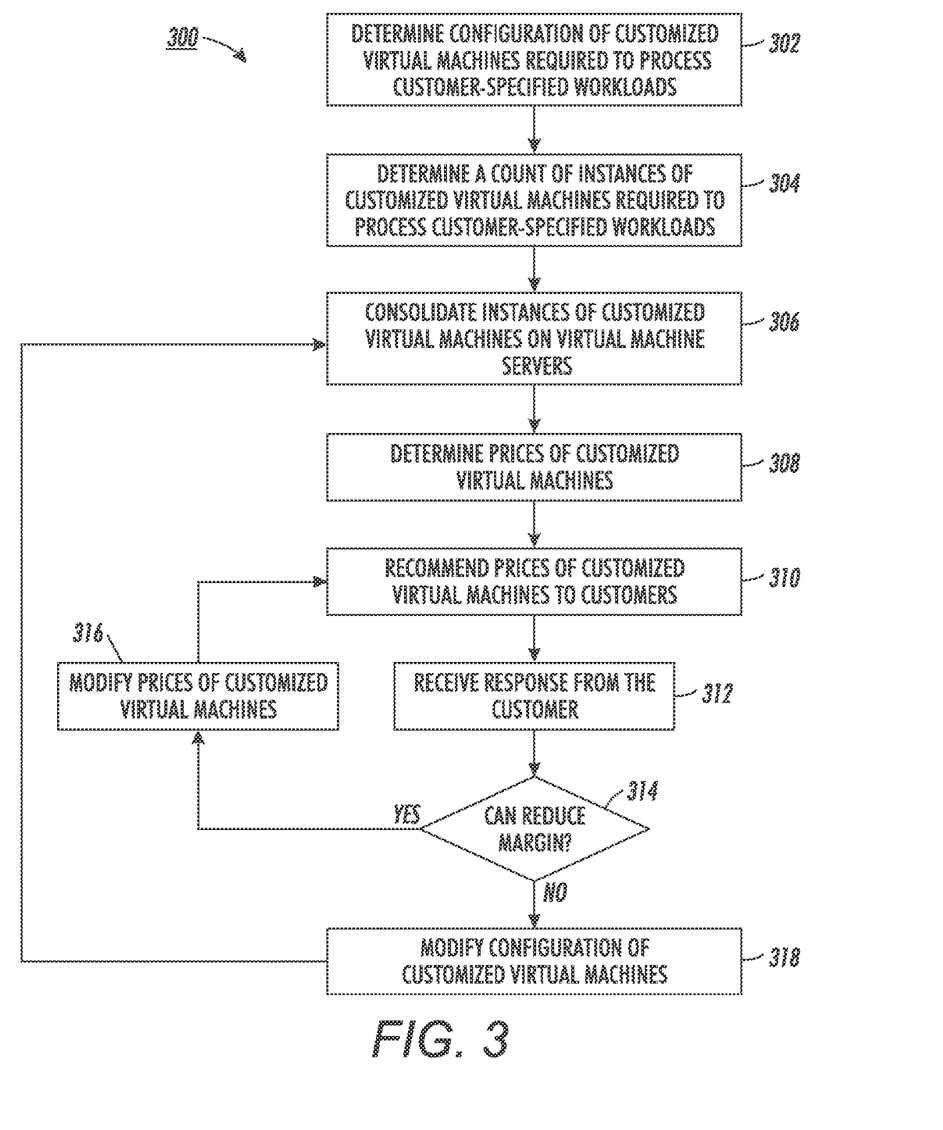
FIG. 3 is a flowchart illustrating a method for determining a price of a customized virtual machine, in accordance with at least one embodiment.

FIG. 3 is a flowchart 300 illustrating a method for determining the prices of the customized virtual machines 112, in accordance with at least one embodiment. The flowchart 300 has been described in conjunction with FIG. 1 and FIG. 2.

At step 302, configuration of the customized virtual machines 112 that is required to process the workload is determined. In an embodiment, the processor 202 determines the configuration of the customized virtual machines 112 based on the computational resource requirement of the workload. Prior to determining the configuration of the customized virtual machines 112, the processor 202 receives the computational resource requirement of the workload from the customer. For example, the computational resource requirement of the workload may be 2 GB RAM, 4 CPUs, and 80 GB of disk space. For determining the configuration of the customized virtual machines 112, the processor 202 may utilize an expected performance level for the execution of the workload (e.g., provided by the customer). In addition, to determine the configuration, the processor 202 may utilize a location of the customized virtual machines 112 (e.g., Dallas, Delhi, Kualalumpur), server types (e.g., Intel®, Dell®, etc.), operating systems, hypervisor, VM types (e.g., low-end, mid-end, high-end etc.), platform (e.g., Hadoop®, MySQL®, etc.), and so forth.

For example, the customer requires a performance level of '8' (on the scale of 10) for executing the workload. The processor 202 firstly determines one or more locations of the virtual machine servers 110 that can deliver the performance level of '8'. For instance, the processor 202 determines that the virtual machine servers 110 at "Dallas" and "Delhi" can deliver the performance level of "8". Thereafter, at each location, the processor 202 determines one or more server types that can deliver the performance level '8'. For instance, processor 202 determines that the Intel servers at both "Dallas" and "Delhi" can deliver the performance level of "8". On similar terms the host OS, and the hypervisor may be selected by the processor 202 for the customized virtual machines 112. Thereafter, the processor 202 determines the configuration of the customized virtual machines 112 that will be able to deliver the performance level "8". Thereafter, the processor 202 determines whether the workload will require a CPU intensive customized virtual machine or a memory intensive customized virtual machine, based on the computational resource requirements for the workload. Accordingly, the processor 202 determines the configuration of the virtual machine at the determined location.

Following Table 1 illustrates the configuration of the customized virtual machines 112 that have been determined based on the requirements constraints inputted by the customer:

TABLE 1

Illustration of the configuration of the customized virtual machine

| Virtual Machine | Location | Virtual Machine type | Hypervisor | RAM | CPUs | Disk Space |
|---|---|---|---|---|---|---|
| 112a | Dallas | Medium | KVM | 4 GB | 2 | 40 GB |
| 112b | Dallas | Medium | Xen | 1 GB | 2 | 20 GB |
| 112c | Delhi | Small | Xen | 2 GB | 1 | 20 GB |

In an embodiment, the U.S. patent application Ser. No. 13/606,023, filed on Sep. 7, 2012, and assigned to the same assignee (Xerox Corporation), and which herein incorporated by reference in its entirety, discloses an example method for determining the configuration of the customized virtual machines 112 based on the computational resource requirements of the workload.

A person having ordinary skills in the art would understand the scope of the disclosure is not limited to determining the configuration of the customized virtual machines 112, as exemplified above. In an embodiment, various other known techniques can be utilized to determine the configuration of the customized virtual machines 112.

At step 304, a count of the instances of the customized virtual machines 112 that is required to process the workload is determined. The processor 202 may utilize the computational resource requirement of the workload and the determined configuration of the customized virtual machines 112 to determine the count. In an embodiment, the processor 202 determines the count of instances of the customized virtual machines 112 based on the following equation:

$$\text{Count of Customized } VMs = \max\left(\frac{\text{computational resource required for the workload}}{\text{computational resource in one customized } VM}\right) \quad (1)$$

For each of the computational resources (e.g., RAM, CPUs, disk space, etc.), the processor 202 determines a ratio of "computational resource required for the workload" and "computational resources associated with the customized virtual machine". For example, for a workload with a computational resource requirement of 8 GB RAM, 4 CPUs, and 100 GB disk space, the processor 202 determines the count of instances of the customized virtual machine 112a (as per Table 1) as:

$$\text{Count of customized virtual machine } 112a = \max\left(\frac{8}{4}, \frac{4}{2}, \frac{100}{40}\right) = 2.5$$

Further, in an embodiment, the count of the instances of the customized virtual machines 112 may be determined based on the historical deployment of one or more previous workloads on the cloud network 104. In an embodiment, a historical data may include information pertaining to the configuration of the virtual machines used for processing the previous workloads. The historical data may further include information pertaining to the count of the virtual machines used for processing the previous workload. The processor 202 may utilize one or more pattern recognition algorithms, and regression techniques on the historical data to determine the count of the instances of the customized virtual machines 112 required to process the workload.

At step 306, the instances of the customized virtual machines 112 are consolidated on virtual machine servers 110. In an embodiment, the processor 202 consolidates the determined customized virtual machines 112 using the bin packing server consolidation technique. During the consolidation, each of the customized virtual machines 112 is built on the virtual machine servers 110. In an embodiment, the computational resources of the customized virtual machines 112 are mapped to the computational resources of the virtual machine servers 110. In an embodiment, the bin-packing method enables consolidation of customized virtual machines 112 having different configurations on a virtual machine server 110A. For example, the virtual machine server 110A may include customized virtual machine 112A for handling CPU-intensive workloads and customized virtual machine 112B for handling memory-intensive workloads. This enables better utilization of the computational resources associated with the virtual machine servers 110 and customized virtual machines 112.

In an embodiment, based on the consolidation, the processor 202 may determine a count of the virtual machine servers 110 that are used for the accommodating the instances of the determined customized virtual machines 112. The processor 202 may also determine the unused resources in the virtual machine servers 110 and the customized virtual machines 112, based on the consolidation.

For example, the configuration of the virtual machine server 110a is 8 GB RAM, 6 CPUs, and 100 GB disk space. If at step 304, the processor 202 determines the count of the instances of the customized virtual machines 112A and 112B (as per Table 1) as 2 and 3, respectively, then the count of the virtual machine server 110A will be two. Further, post consolidation, 5 GB RAM, 2 CPUs, and 60 GB disk space will be unused in the virtual machine server 110A.

At step 308, the prices of the customized virtual machines 112 are determined. The processor 202 may determine the prices of the customized virtual machines 112 based on the count of the virtual machine servers 110 and the unused resources. For example, in an embodiment, the price of the customized virtual machine 112a may be determined based on the following equation:

$$P = M + S^* C_S + R^* C_R + R'^* C_{R'} + C_O \quad (2)$$

where,

P=Total price of the customized virtual machine,
M=Expected margin provided by the cloud service provider,
S=Number of the virtual machine servers,
$C_S$=Cost per virtual machine server,
R=Total amount of used resources,
$C_R$=Cost corresponding to the used resources,
R'=Total amount of unused resources,
$C_{R'}$=Cost corresponding to the unused resources, and
$C_O$=Costs involved in maintaining the cloud network.

In an embodiment, the various cost values (i.e., $C_S$, $C_R$, $C_{R'}$, $C_O$) are provided by the cloud service provider and thus determined prices may be different for different cloud service providers. In an embodiment, margin corresponds to a profit margin of the cloud service provider in renting the customized virtual machines 112 to the customers.

In an alternate embodiment, the prices of the customized virtual machines 112 may be determined relative to a cost of one or more original virtual machines of fixed configuration that were previously used to process such workloads. In an embodiment, the cost of the original virtual machines may be determined from the historical data. In an embodiment, the configuration of the original virtual machine is different from the customized virtual machines 112.

For example, the prices of the customized virtual machines 112 may be determined by considering the ratio $S/S_{old}$ and $R'/R'_{old}$, where $S_{old}$=Number of the virtual machine servers 110 required, as per step 306, when the original virtual machines were used;

$R_{old}$=Total amount of unused resources, as per step 306, when the original virtual machines were used.

In an embodiment, the processor 202 may determine the prices of the customized virtual machines 112 by modifying the cost of original virtual machines based on the ratio $S/S_{old}$ and $R'/R'_{old}$.

At step 310, the determined prices of the customized virtual machines 112 are recommended to the customer. The processor 202 may recommend the prices to the customer on a display device associated with the customer. In an embodiment, the processor 202 may recommend the determined prices through the client application on the customer-computing devices 102.

In an embodiment, the recommendation may include a comparison between the cloud service provider corresponding to the cloud network 104 and other cloud service providers. Further, the comparison may be with respect to at least one of the prices of the customized virtual machines 112, the configuration of the customized virtual machines 112, or a performance of the customized virtual machines 112. Table 2 illustrates a comparison (for the customized virtual machine 112A) that may be presented to the customer, along with the recommendation.

TABLE 2

Illustration of recommendation made to the customer

| Attribute | Cloud service provider 1 | Cloud service provider 2 | Cloud service provider 3 |
|---|---|---|---|
| Price | $16.06/month | $43.80/month | 87.60/month |
| Configuration | 4 GB RAM<br>2 CPUs<br>40 GB disk space | 2 GB RAM<br>1 CPUs<br>120 GB disk space | 87.60/month |
| Performance | Level 1 | Level 3 | Level 4 |

At step 312, a response is received from the customer indicative of the acceptance of the prices of the customized virtual machines 112. In an embodiment, the processor 202 receives the response from the customer. The processor 202 performs a check to confirm if the customer has accepted the determined prices presented to the customer in step 310. In case, the customer accepts the determined prices of the customized virtual machines 112, the customer may proceed with the payment for the customized virtual machines 112. In case, the customer does not accept the determined prices, the processor 202 may perform step 314.

At step 314, it is determined whether the margin provided by the cloud service provider can be reduced. In an embodiment, the processor 202 performs the check. In an embodiment, the cloud service provider may have defined a minimum threshold value of the margin below which the margin cannot be reduced by the processor 202. Further, the cloud service provider may have defined the levels of the margin to be considered by the processor 202. If the processor 202 determines that the margin can be reduced, step 316 is executed else, step 318 is executed.

In an alternate embodiment, a modified margin is determined based on a negotiation with the customer on the cost of the customized virtual machine. In such a scenario, the processor 202 performs the check whether the modified margin determined based on the negotiation with the customer is acceptable as per the minimum threshold defined by the cloud service provider (as discussed in step 314).

At step 316, the prices of the one or more customized virtual machines 112 are modified. Prior to modifying the prices of the customized virtual machine, the processor 202 reduces the margin of based on the predetermined levels defined by the cloud service providers. Thereafter, the processor 202 modifies the price of the customized virtual machines 112.

Further, the modified prices may be recommended to the customer, as per step 310, and the response may be received from the customer, as per step 312. It will be apparent to a person skilled in the art that the steps 310-step 316 may be repeated till a competitive price, as per the customer, is determined by the processor 202.

At step 318, the configuration of the one or more customized virtual machines 112 is modified. In an embodiment, when the processor 202 determines that the margin cannot be reduced, the processor 202 may modify the configuration of the customized virtual machines 112. In an embodiment, the processor 202 may randomly select a new customized virtual machine from the determined customized virtual machines 112. For example, if the price of the customized virtual machine 112A (as per Table 1), recommended to the customer is not accepted by the customer and if the processor 202 determines that the margin cannot be reduced, the processor 202 may modify the configuration of the customized virtual machine 112A by selecting the customized virtual machine 112B.

In an alternate embodiment, the processor 202 may modify the configuration of the customized virtual machine 112A to make the configuration to be better effective in the consolidation process (as per step 306) and therefore, may reduce prices by reducing the count of the virtual machine servers 110 to be used. Additionally, by better fitting the configuration of the customized virtual machine 112A to the virtual machine servers 100, the processor 202 may reduce the unused resources and therefore, reducing the overall cost of the customized virtual machine. In order to modify the configuration of the virtual machine 112A, the ratio of resource capacity of the virtual machine 112A is modified such that the modified ratio of the resource capacity of the virtual machine 112A is close to the ratio of resource capacities of the virtual machine server 110. For example, the resource capacities of a virtual machine server 110 are 8 CPUs, 16 GB memory, and 512 GB disk space. For instance, the configuration of customized virtual machine 112a for an application is 3 CPUs, 4 GB memory, and 80 GB disk space. In such a scenario, only two customized virtual machines will be consolidated into the virtual machine server 110, and 2 CPUs, 8 GB memory, and 352 GB disk space remain unused. When the configuration of the customized virtual machine 112A is changed to 2 CPUs, 4 GB memory, and 80 GB disk space, then 4 virtual machines 112A can be consolidated to the virtual machine server 110, and hence the unused resources in the virtual machine server 110 are reduced.

Post modifying the configuration of the customized virtual machines 112, the processor 202 may repeat the steps 306 to 318.

The disclosed embodiments encompass numerous advantages. In a competitive cloud marketplace, cloud service providers generally try to gain advantage over competitors by lowering the prices of the virtual machines that have fixed configurations in terms of the computational resources. The virtual machines with fixed configurations may not cater to varying computational resource requirements of different workloads (e.g., web transactions, big data analytics, etc.). In the proposed disclosure, however, the configurations of the virtual machines may be customized as per the varying computational resource requirements of the workloads. Further, the configuration of the customized virtual machines 112 is determined such that the number of the virtual machine servers 110 as well as unused resources in the virtual machine servers 110 and the customized virtual machines 112 is minimized. Thus, operational costs involved in maintaining the cloud network 104 are minimized. By recommending the price of the customized virtual machines along with comparison with other cloud service providers, the customers of the cloud network 104 can explore various combinations of the configurations for the customized virtual machines 112. Thus, by providing the customers options to explore different prices and the configurations of the customized virtual machines, the cloud service providers can gain competitive advantage.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of determining the price of the customized virtual machines are disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for minimizing unused physical resources in a virtual machine server, the method comprising:
    determining, by one or more processors, a count of instances of a customized virtual machine required to process a customer-specified workload, wherein the customized virtual machine has a virtual resource capacity comprising a virtual memory, a number of virtual processors, and a virtual storage amount, and wherein determining the count of instances further comprises dividing a resource requirement of the customer-specified workload by the virtual resource capacity of the customized virtual machine;
    consolidating, by the one or more processors, the instances of the customized virtual machine on the virtual machine server, wherein the virtual machine server has a physical resource capacity comprising a physical memory, a number of physical processors, and a physical storage amount;
    determining, by the one or more processors, the unused resources in the virtual machine server based in part on a comparison of a ratio of the virtual resource capacity of the customized virtual machine with a ratio of the physical resource capacity of the virtual machine server;
    determining, by the one or more processors, a price for the customized virtual machine based on the instances of the customized virtual machine, the unused resources in the virtual machine server, and an expected profit margin;
    transmitting, from the one or more processors to a device associated with the customer-specified workload, a recommendation comprising the price;
    receiving, by the one or more processors from the device, a notification that the price was not accepted;
    upon receiving the notification that the price was not accepted, determining, by the one or more processors, that the expected profit margin can be reduced to within a minimum threshold value associated with the expected profit margin;
    determining, by the one or more processors, a reduced price based on the reduced expected profit margin;
    transmitting, by the one or more processors, the reduced price to the device associated with the customer-specified workload;
    receiving, by the one or more processors from the device, a notification that the reduced price was not accepted;
    upon receiving the notification that the reduced price was not accepted, determining, by the one or more processors, that the reduced expected profit margin cannot be further reduced to below the minimum threshold value;
    upon determining that the reduced expected profit margin cannot be further reduced, modifying, by the one or more processors, the virtual resource capacity of the customized virtual machine by changing at least one of the virtual memory, the number of virtual processors, or the virtual storage amount of the customized virtual machine, such that a ratio of the modified virtual resource capacity is closer to the ratio of the physical resource capacity, and the unused resources in the virtual machine server are minimized; and
    determining a second reduced price for the customized virtual machine based on the modified virtual resource capacity and the minimized unused resources.

2. The method of claim 1, wherein the consolidation is performed using a bin-packing method.

3. The method of claim 1, wherein the modification of the virtual resource capacity is performed based on at least one of a random selection from the one or more customized virtual machines or a modification of one or more of the virtual memory, the number of virtual processors, or the virtual storage amount.

4. A system for minimizing unused physical resources in a virtual machine server, the system comprising:
one or more processors operable to:
determine a count of instances of a customized virtual machine required to process a customer-specified workload, wherein the customized virtual machine has a virtual resource capacity comprising a virtual memory, a number of virtual processors, and a virtual storage amount, and wherein determining the count of instances further comprises dividing a resource requirement of the customer-specified workload by the virtual resource capacity of the customized virtual machine;
consolidate the instances of the customized virtual machine on a virtual machine server, wherein the virtual machine server has a physical resource capacity comprising a physical memory, a number of physical processors, and a physical storage amount;
determine the unused resources in the virtual machine server based in part on a comparison of a ratio of the virtual resource capacity of the customized virtual machine with a ratio of the physical resource capacity of the virtual machine server;
determine a price for the customized virtual machine based on the instances of the customized virtual machine, the unused resources in the virtual machine server, and an expected profit margin;
transmit a recommendation comprising the price to a device associated with the customer-specified workload;
receive a notification that the price was not accepted from the device;
determine that the expected profit margin can be reduced to within a minimum threshold value associated with the expected profit margin;
determine a reduced price based on the reduced expected profit margin;
transmit the reduced price to the device associated with the customer-specified workload;
receive a notification from the device that the reduced price was not accepted;
upon receiving the notification that the reduced price was not accepted, determine that the reduced expected profit margin cannot be further reduced to below the minimum threshold value;
upon determining that the reduced expected profit margin cannot be further reduced, modify the virtual resource capacity of the customized virtual machine by changing at least one of the virtual memory, the number of virtual processors, or the virtual storage amount of the customized virtual machine, such that a ratio of the modified virtual resource capacity is closer to the ratio of the physical resource capacity, and the unused resources in the virtual machine server are minimized; and
determine a second reduced price for the customized virtual machine based on the modified virtual resource capacity and the minimized unused resources.

5. The system of claim 4, wherein the consolidation is performed using a bin-packing method.

6. The system of claim 4, wherein the modification of the virtual resource capacity is performed based on at least one of a random selection from the one or more customized virtual machines or a modification of one or more of the virtual memory, the number of virtual processors, or the virtual storage amount.

7. A computer program product for use with a computer, the computer program product comprising a non-transitory computer readable medium, wherein the non-transitory computer readable medium stores a computer program code for minimizing unused physical resources in a virtual machine server, wherein the computer program code is executable by one or more processors to:
determine a count of instances of a customized virtual machine required to process a customer-specified workload, wherein the customized virtual machine has a virtual resource capacity comprising a virtual memory, a number of virtual processors, and a virtual storage amount, and wherein determining the count of instances further comprises dividing a resource requirement of the customer-specified workload by the virtual resource capacity of the customized virtual machine;
consolidate the instances of the customized virtual machine on a virtual machine server, wherein the virtual machine server has a physical resource capacity comprising a physical memory, a number of physical processors, and a physical storage amount;
determine the unused resources in the virtual machine server based in part on a comparison of a ratio of the virtual resource capacity of the customized virtual machine with a ratio of the physical resource capacity of the virtual machine server;
determine a price for the customized virtual machine based on the instances of the customized virtual machine, the unused resources in the virtual machine server, and an expected profit margin;
transmit a recommendation comprising the price to a device associated with the customer-specified workload;
receive a notification that the price was not accepted from the device;
determine that the expected profit margin can be reduced to within a minimum threshold value associated with the expected profit margin;
determine a reduced price based on the reduced expected profit margin;
transmit the reduced price to the device associated with the customer-specified workload;
receive a notification from the device that the reduced price was not accepted;
upon receiving the notification that the reduced price was not accepted, determine that the reduced expected profit margin cannot be further reduced to below the minimum threshold value;
upon determining that the reduced expected profit margin cannot be further reduced,
modify the virtual resource capacity of the customized virtual machine by changing at least one of the virtual memory, the number of virtual processors, or the virtual storage amount of the customized virtual machine, such that a ratio of the modified virtual resource capacity is closer to the ratio of the physical resource capacity, and the unused resources in the virtual machine server are minimized; and
determine a second reduced price for the customized virtual machine based on the modified virtual resource capacity and the minimized unused resources.

* * * * *